E. E. EMSHWILLER.
ROAD MAKING MACHINE.
APPLICATION FILED APR. 1, 1914. RENEWED DEC. 30, 1916.
1,236,919.
Patented Aug. 14, 1917.
3 SHEETS—SHEET 3.
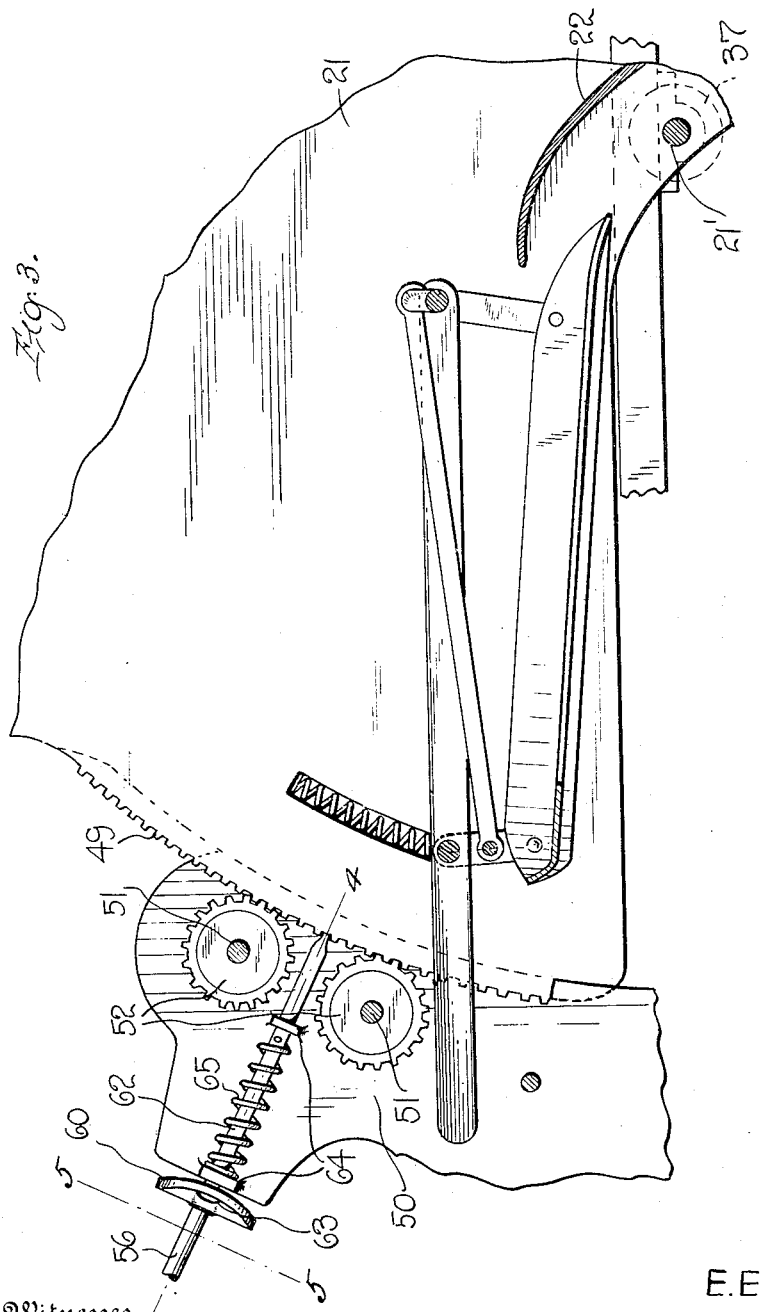
Inventor
E. E. EMSHWILLER
Witnesses
Robert M. Sutphen
A. J. Hind
By Watson E. Coleman
Attorney

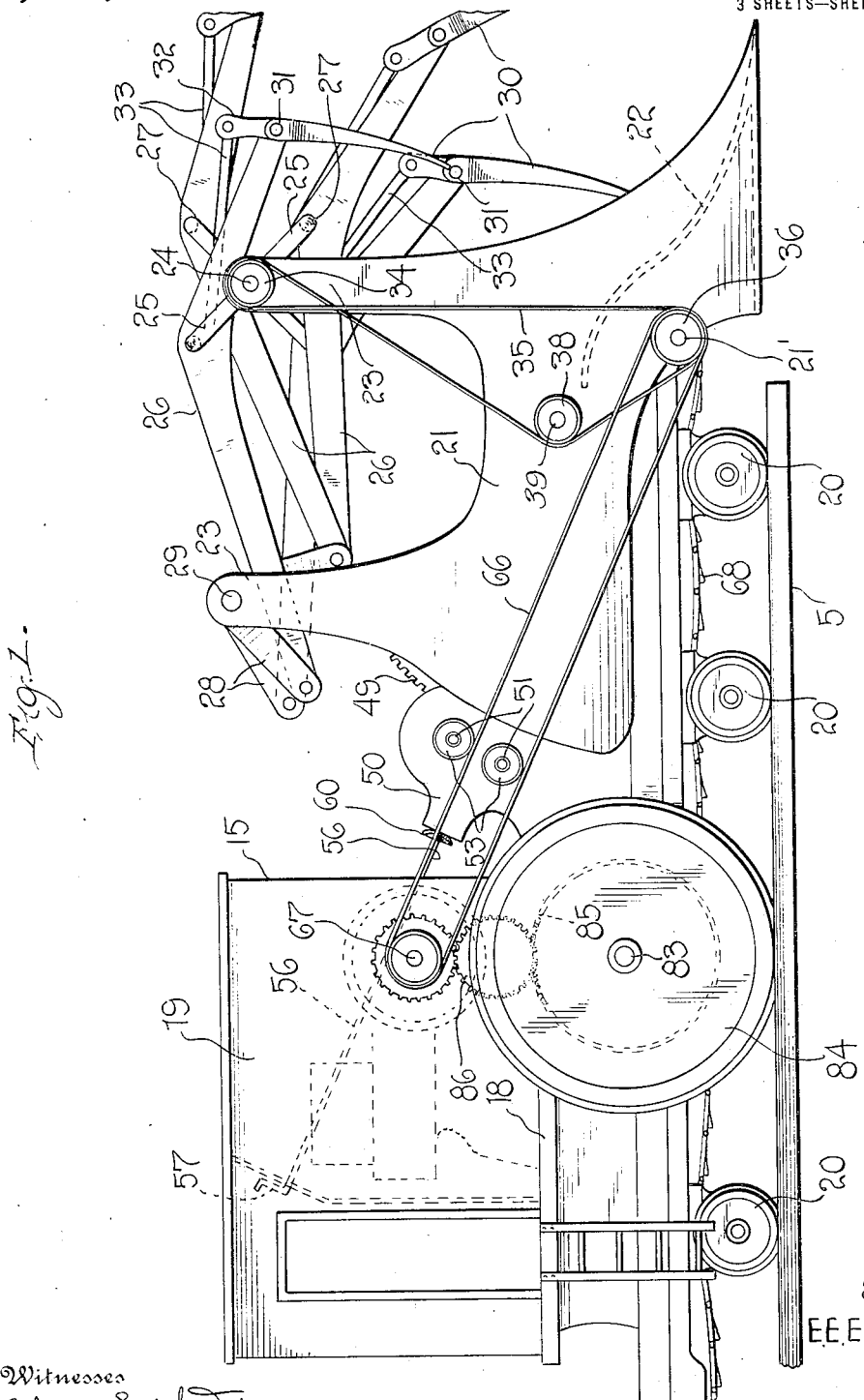

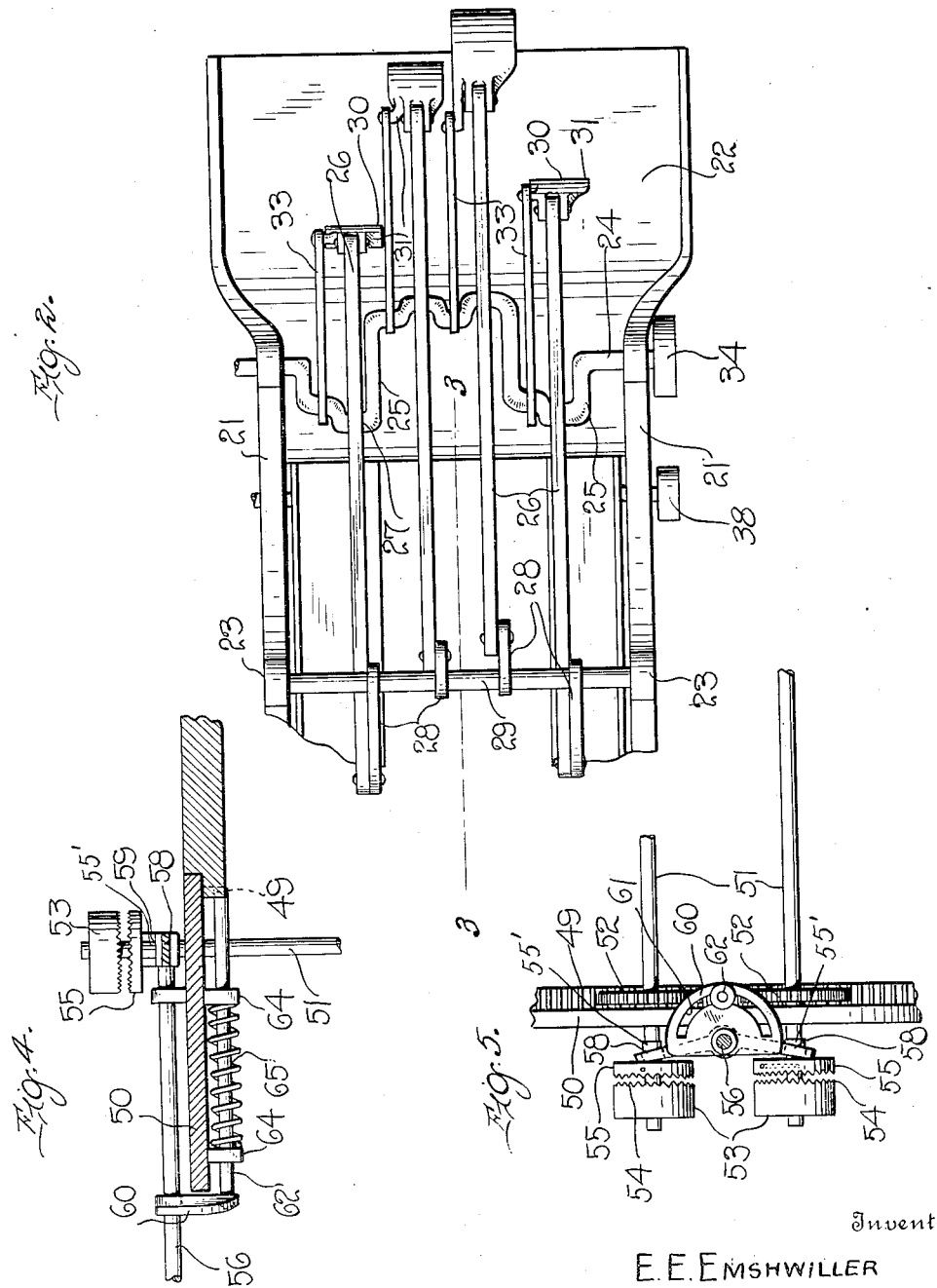

UNITED STATES PATENT OFFICE.

ERROL E. EMSHWILLER, OF LE ROY, MICHIGAN.

ROAD-MAKING MACHINE.

1,236,919.  Specification of Letters Patent.  Patented Aug. 14, 1917.

Application filed April 1, 1914, Serial No. 828,849. Renewed December 30, 1916. Serial No. 139,929.

*To all whom it may concern:*

Be it known that I, ERROL E. EMSHWILLER, citizen of the United States, residing at Le Roy, in the county of Osceola and State of Michigan, have invented certain new and useful Improvements in Road-Making Machines, of which the following is a specification, reference being had to the accompanying drawings.

This invention relates to improvements in excavating machines and has for its primary object to provide mechanism for expeditiously cutting away an earth embankment or hill and disposing of the excavated material.

My invention contemplates the provision in a machine for constructing roads or highways, of a plow arranged on the forward end of the machine and adapted to penetrate a hillside or embankment, a plurality of oscillatory hoes, and improved means for actuating said hoes, to loosen the earth and direct the same upon the plow blade.

The invention has for another object to provide a plow blade tiltably mounted upon the forward end of the machine, and improved means for locking the plow blade in its adjusted position whereby the same will penetrate the earth embankment at the desired angle.

It is also the general object of the invention to provide a machine of the above character which is highly efficient in operation, will greatly facilitate the construction of public roads or highways and may be manufactured and operated at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is an enlarged elevation of the engine upon which the plow is mounted;

Fig. 2 is a top plan view of the front end of the machine;

Fig. 3 is a longitudinal section taken on the line 3—3 of Fig. 2;

Fig. 4 is a section taken on the line 4—4 of Fig. 3;

Fig. 5 is a section taken on the line 5—5 of Fig. 3.

The machine forming the subject matter of the present application includes an engine 15 which is provided for the operation of the digging or excavating mechanism.

This engine includes a platform 18 upon which the usual engineer's cab 19 is secured, said platform being supported upon a plurality of pairs of truck wheels 20. Upon the forward end of the engine platform 18, vertically disposed blades or plates 21 are pivotally mounted as at 21', said blades constituting the side walls of a plow. These blades terminate at their forward lower ends in a point and are connected by the upwardly and rearwardly curved transversely disposed mold board 22. The forward edge of this mold board may be either concave, convex or provided with saw teeth as may be desired and deemed advisable as the particular character of the earth to be excavated shall indicate. Each of the plow blades 21 is provided with spaced upwardly projecting arms 23. In the forward arms 23, the ends of a crank shaft 24 are journaled. Upon this shaft 24, the arms 25 extending in opposition to each other are secured. The ends of these arms project radially from the shaft, and upon the same, the longitudinally extending bars 26 are fulcrumed as at 27. These bars extend forwardly and rearwardly of the respective arms, and the rear ends thereof are pivotally connected to links 28 which are loosely mounted upon a transverse rod 29 secured at its ends in the rear upwardly extending bars 23. The forward ends of the respective bars 26 have pivotally mounted thereon as shown at 31, a hoe blade 30. This blade is formed with an extension or lug 32 which projects upon the opposite side of the bar 26 with respect to the body of said blade and is connected by means of a link rod 33 to the arm 25 upon which said bar is mounted. A pulley or band wheel 34 is fixed upon one end of the shaft 24 and engaged by the crossed power transmission belt 35, one stretch of which extends downwardly around a pulley 36 secured upon the shaft 21' of the forward conveyer roller 37. The belt 35 is crossed in order to transmit rotation to the shaft 24 in the proper direction. One stretch of this belt is trained over a guide pulley 38 fixed upon the shaft 39.

To the rear curved edge of each of the blades 21, a rack 49 is secured. The forward supports for the engineer's cab 19 are provided with extensions 50 which project upwardly, the racks 49 on the blades 21 of the plow fitting between these extensions and contiguous to the inner faces thereof. It will thus be seen that the blade 21 is, in effect, provided with two rear edges, one formed by the rack 49, and the other or outer edge abutting against the forward edge of the plate 50. In these extensions 50 of the cab supports, the ends of spaced parallel shafts 51 are journaled. Each of these shafts is provided with cog wheels 52 fixed thereon which mesh with the respective racks 49. Upon one end of each of said shafts a loose pulley 53 is also mounted, said pulley being provided with clutch teeth indicated at 54 on one face. A sliding clutch disk 55 is keyed upon each shaft for engagement with the clutch face of the respective pulleys. An obliquely inclined rod 56 is suitably mounted in the forward end of engineer's cab, said rod being provided upon one end with a hand wheel 57 and having a lever 58 fixed upon its other end. The ends of this lever are provided with elongated openings 59 to loosely receive the respective shafts 51. The ends of said lever are disposed adjacent to the sliding clutch disks 55, each of said disks being provided with a sleeve 55' which is loosely fitted within the opening 59 in the end of the lever. The lower end of the rod 56 is further provided with a concavo-convex plate 60 of substantially semi-circular form, in which a curved slot 61 is provided. Through this slot, the upper end of a rod 62 extends, said rod having a head 63 on its upper end which bears against the concave face of the plate 60. This rod 62 is movable through spaced guide lugs 64 which are secured to the extension 50 of the cab support, and upon said rod between the guide lugs, a spring 65 is arranged, one end of said spring being fixed to the rod while the other end thereof is secured to the upper lug 64. This spring normally acts to yieldingly hold the lower end of the rod 62 in engagement with adjacent teeth on the rack 49 and thereby effectively lock the tilting plow against movement from its adjusted position. While it is only necessary to provide one of these locking rods, it will be obvious that if desired, the same may be employed upon each side of the machine.

66 indicates a driving belt or chain which extends from the driven wheel or sprocket on the engine shaft indicated at 67 to a similar wheel or sprocket on the shaft of the forward conveyer roller 37 whereby the conveyer 68 is positively driven in the operation of the machine. The sprocket on the engine shaft may be fixed upon the shaft or released therefrom by means of the ordinary clutch device as will be readily understood. As thus far described, the operation of the machine for the excavation of the earth will be understood as follows:

When the engine is set in operation, the shaft 24 is rotated through the medium of the power transmission belt 35, and the hoe blades 30 alternately raised and lowered by means of the connections above referred to, said blades in their downward movement digging into the earth embankment and loosening the earth which is caught upon the rearwardly and upwardly curved mold board 22 and directed thereby backwardly upon the conveyer 68. The point of the plow may be readily raised or lowered by simply rotating the rod 56 in either direction. It will be obvious that when this rod is rotated, the concave face of the plate 60 moving against the head 63 on the rod 62, forces said rod upwardly as the same moves into one end or the other of the slot 61, thereby withdrawing the lower end of the rod 62 from engagement with the teeth of the rack 49 and releasing the side blades 21 of the plow so that the same may readily tilt upon the platform 18. This tilting of the plow is automatically effected immediately after the release of the same by the lever 58 on the lower end of the rod 56 forcing one of the clutch disks 55 into engagement with the clutch face of the related loose pulley 53 and locking said pulley upon its shaft. This pulley being engaged by one stretch of the drive belt 66 will cause one of the shafts 51 to be rotated, and the cog wheels 52 meshing with the racks 49 thus positively tilt the plow in one direction or the other as the case may be.

The drive wheels 84 are mounted upon the shaft 83, and on said shaft a gear wheel 85 is fixed. This gear wheel meshes with an intermediate gear 86 which in turn is geared to the engine shaft as clearly shown in Fig. 1. The machine is supported by truck wheels 20 which are mounted for movement upon a suitable track indicated at 5.

From the foregoing description taken in connection with the accompanying drawings, it is believed that the construction and arrangement of the several coöperating devices will be readily understood and the manner in which the machine is designed for the construction of roadways rendered clearly apparent. By means of my invention, it will be apparent that the time and labor incident to the construction of roads and highways are greatly reduced as well as the cost of such construction. The machine as a whole is comparatively simple, and highly durable and efficient in operation.

While I have shown and described the preferred construction and arrangement of the several elements, it will be understood that the invention is susceptible of considerable modification therein and I therefore reserve the privilege of resorting to all such legitimate modifications as may be fairly embodied within the spirit and scope of the appended claims.

Having thus described the invention, what is claimed is:

1. In a machine of the character described, a plurality of vertically and longitudinally oscillating levers, digging blades movably mounted upon said levers, means for actuating the levers, and additional means operated by the lever actuating means for automatically moving said blades with respect to the levers in the movement of the latter.

2. In a machine of the character described, a rotatable supporting element, a lever fulcrumed intermediate of its ends upon said element, a movable digging blade mounted upon one end of said lever, means for rotating the supporting element, and additional means actuated by said supporting element for automatically moving the digging blade with respect to said lever in the movement of the latter.

3. In a machine of the character described, a shaft, a plurality of oscillatory levers mounted upon said shaft, digging blades pivotally mounted upon one of the ends of said levers, means for rotating said shaft to move the levers in vertical and longitudinal planes, and additional means actuated by said shaft to move said digging blades with respect to the levers in the movement of the latter.

4. In a machine of the character described, a vertically tiltable plow including spaced side plates and an earth directing blade connecting said plates at their forward ends, means for tilting said plow in either direction at the will of the operator, means for operating said last named means, means for locking the plow against tilting movement, and manually operable means for simultaneously releasing the plow and cooperatively connecting the plow tilting means to said operating means.

5. In a machine of the character described, a vertically tiltable plow including side plates and a rearwardly and upwardly curved blade connecting said plates at their forward ends, racks secured to the rear edges of said plates, spaced transverse shafts mounted rearwardly of the plow, cogs fixed upon the respective shafts for engagement with said racks, a power driven belt, a clutch pulley mounted upon each of the shafts and engaged with the respective stretches of the belt, and manually operable means to lock either of the clutch pulleys upon the shaft and transmit rotation to said shaft whereby the plow is tilted in either direction at the will of the operator.

6. In a machine of the character described, a vertically tiltable plow including side plates and an earth directing blade connecting said plates at their forward ends, racks secured upon the rear edges of said side plates, spaced cogs engaged with the respective racks, a spring held bolt normally engaged with one of said racks to lock the plow against tilting movement, an operating member, and manually operable means for retracting the locking bolt to release the plow and simultaneously establishing a driving connection between said operating member and the corresponding cogs upon opposite sides of the plow.

7. In a machine of the character described, a vertically tiltable plow including side plates and a transverse blade connecting said plates at their forward ends, racks secured to the rear edges of said side plates, spaced cogs engaged with the respective racks, a power driven belt, shiftable elements to establish a driving connection between either of the cogs and one stretch of the belt, a spring pressed bolt engaging one of the racks to lock the plow against tilting movement, a manually rotatable rod, and means fixed to said rod to retract said bolt and release the plow and simultaneously shift one of said elements into engagement with the driving belt whereby the plow may be tilted in either direction at the will of the operator.

8. In a machine of the character described, a vertically tiltable plow including spaced side plates, racks secured on the rear edges of said plates, a pair of cog wheels engaged with the respective racks, a spring pressed bolt normally engaged with one of the racks to lock the plow against tilting movement, a manually rotatable rod, means actuated when said rod is rotated in either direction to establish a driving connection between one of said cogs and one stretch of the belt, and means on said rod engaged with one end of said bolt to simultaneously retract the same and release the plow for oscillating movement.

9. In a machine of the character described, a vertically tiltable plow including spaced side plates, racks secured to the rear edges of said plates, spaced transverse shafts mounted rearwardly of said plow, cogs fixed upon each of the shafts and engaging the respective racks, a loose pulley mounted upon one end of each shaft, a power driven belt, the respective stretches of said belt engaging the pulleys on the respective shafts, longitudinally shiftable clutch members mounted upon the shafts to lock said pulleys thereon and rotate the shafts in relatively opposite directions, manually operable means for shifting either of said clutch members into engagement with the pulley, means for locking the plow against tilting movement, and additional means operable with said clutch operating means to actuate the locking means and release the plow whereby the same may be tilted in either direction at the will of the operator.

10. In a machine of the character described, a shaft having spaced cranks, a lever oscillatably mounted on each of said cranks, a relatively movable digging blade carried by each lever, means connecting the blades to the respective cranks to move said blades with respect to the levers in the oscillation of the latter, and means for rotating said shaft.

11. In a machine of the character described, a plow including side plates each provided with spaced forwardly projecting arms, transverse shafts mounted in the opposed arms, the forward shaft having a plurality of cranks, levers fulcrumed intermediate of their ends upon the respective cranks of said forward shaft, links loosely hung upon the rear transverse shaft and connected to the rear ends of the respective levers, hoe blades pivotally mounted adjacent one of their ends upon the forward ends of said levers, link rods connecting the pivoted ends of said blades to the respective cranks of the forward shaft inwardly of the pivots of the respective levers, and means for rotating said forward shaft to engage the hoe blades in the earth and direct the same rearwardly upon the plow.

12. In a machine of the character described, a shaft, a plurality of levers oscillatably supported intermediate of their ends upon the shaft, means for rotating said shaft, means connected to the levers at one of their ends to cause an oscillation of the levers with respect to each other, a digging blade pivotally mounted upon the other end of each lever, and means operatively connecting each digging blade to said shaft whereby the blades are moved relative to the levers in the rotation of said shaft.

13. In a machine of the character described, a vertically tiltable plow, a rack mounted upon the plow, manually controllable means adapted for operative engagement with the rack to tilt the plow, additional means to co-act with the rack and lock the plow against tilting movement, and means to actuate the last named means and release the plow and simultaneously effect an operative engagement of the plow tilting means with said rack.

14. In a machine of the character described, a vertically tiltable plow, a rack secured to the plow, a gear meshing with said rack, manually controllable means to rotate the gear, a locking bolt to co-act with the teeth of the rack and hold the plow against tilting movement, and means to release the bolt from engagement with the rack and simultaneously actuate the manually controllable means to rotate the gear.

In testimony whereof I hereunto affix my signature in the presence of two witnesses.

ERROL E. EMSHWILLER.

Witnesses:
BENJAMIN CLOSSON,
A. HAHN.